UNITED STATES PATENT OFFICE.

SAMUEL R. SCHOLES, OF BEAVER, PENNSYLVANIA, ASSIGNOR TO H. C. FRY GLASS COMPANY, OF ROCHESTER, PENNSYLVANIA, A CORPORATION OF PENNSYLVANIA.

PROCESS OF OBTAINING COMBINED POTASSIUM FROM MINERALS.

1,327,782. Specification of Letters Patent. Patented Jan. 13, 1920.

No Drawing. Application filed August 20, 1917. Serial No. 187,211.

*To all whom it may concern:*

Be it known that I, SAMUEL R. SCHOLES, a citizen of the United States, residing at Beaver, in the county of Beaver and State of Pennsylvania, have invented certain new and useful Improvements in Processes of Obtaining Combined Potassium from Minerals; and I do hereby declare the following to be a full, clear, and exact description of the invention, such as will enable others skilled in the art to which it appertains to make and use the same.

This invention relates to a method of supplying the potassium compound required in starting the process described and claimed in the copending application Serial No. 167,694, filed May 10, 1917, by Scholes & Brenner, entitled Process of extracting potassium from potash bearing minerals, and it has for its object to provide said potassium compound in a manner more expeditious and less costly than has been heretofore proposed.

With these and other objects in view the invention consists in the novel steps and combinations of steps constituting this starting process, all as will be more fully hereinafter disclosed and particularly pointed out in the claims.

In carrying out the present invention, I proceed substantially as disclosed in said copending application Serial No. 167,694 with the exception that I derive the potassium compound to be added to the potassium bearing mineral from the mineral itself instead of from an outside source, and thus avoid the heavy expense that is now necessary in purchasing said compound in the open market.

That is to say, in carrying out this invention I may finely divide, as by grinding, any suitable naturally occurring potassium bearing silicate, such as feldspar, for example, and add thereto a quantity of sodium carbonate, or an equivalent amount of some other suitable sodium compound, sufficient to supply say one equivalent of sodium oxid $Na_2O$, to every two equivalents of silicon dioxid $SiO_2$ present in the rock.

These materials are thoroughly mixed, and are then melted down to a glass-like mass in any suitable pot or furnace. This glass-like mass is next brought to a fine state of subdivision, as by pouring it while still molten into water to shatter the same, and then grinding the fragments in either a wet or dry condition in any suitable mill.

The finely subdivided product of fusion is next mixed with about two or three times its weight of water and preferably boiled in a suitable container for an hour or two while carbon dioxid gas $CO_2$ or a furnace gas containing carbon dioxid is forced into and through the mixture. The heat may be turned off and carbon dioxid or said furnace gas again forced through the mixture until test portions show no undecomposed silicates, or that the dissolved alkali metal compounds have reached a maximum.

If feldspar and sodium carbonate have been employed in the above procedure, the dissolved alkali metal compounds will consist of the carbonates and bi-carbonates of sodium and potassium, and the solids present will contain compounds of aluminum and silicon in the form of transparent flocculent precipitates quite distinct from the opaque white particles of the ground fusion product from which they were derived. The said alkali metal carbonates and bi-carbonates may now be separated from the insolubles as by filtration, and evaporated to dryness, whereupon the mixed carbonates thus obtained will be found to consist of say about four parts of sodium carbonates to one part of potassium carbonates derived from the rock. One fifth by weight of these carbonates is now removed and the remaining four fifths, or the weight of the original sodium carbonate, is now added to a fresh batch of rock and the process repeated, whereupon the next dry mixture of carbonates obtained will contain say two parts of potassium carbonates to less than three parts of sodium carbonate.

One fifth by weight of this second batch of carbonates is now removed and a weight of mixed carbonates equal to that of the original batch of sodium carbonate is again segregated, added to a third batch of rock, and the cycle again carried out. The resulting carbonates will show say three parts potassium carbonates, to less than two parts sodium carbonate, and this procedure is repeated until say five batches of carbonates have been produced or until only a very small percentage of sodium carbonates remain.

In practice I find that after having carried out the cycle five times the original sodium salt has disappeared to such a degree that only potassium salts derived from the rock may be considered as remaining for many purposes. Instead of repeating the cycle in the manner just disclosed, I also find a satisfactory procedure to be as follows:—

I may evaporate the first obtained solution of carbonates until a concentration is reached at which most of the sodium carbon precipitates, leaving substantially all the potassium carbonate in solution.

The latter separated from the precipitated sodium carbonate can be evaporated to dryness, and added to the proper proportion of feldspar, and the cycle repeated whereupon the original sodium carbonates will substantially disappear at once and the process may be continued on potassium carbonate derived from the original rock.

In any case it will now be clear that by following the procedure outlined, I am enabled to readily obtain the necessary amount of combined potassium to start the process disclosed in said application Serial No. 167,694, from the rock itself without disturbing the orderly procedure of the factory organization, and I am also enabled to avoid a very heavy expense which is now otherwise necessary in starting said process on a large commercial scale.

It is an important feature of the invention that a quantity of mixed carbonates, equal to that of the combined potassium extracted from the rock, is removed at the end of each cycle, for otherwise the proportions would soon be wrong and the process would fail either from an accummulation of too much combined alkali metal present in the charge thus clogging the plant, or else there would be a deficiency of said metal requiring a change in the amount of rock, water, etc., employed in the plant.

In either case the smooth operation of the plant would be interfered with and extra expense entailed. After the required amount of combined potassium is thus obtained from the rock itself, the process is repeated as a routine matter and the proper amount of potassium carbonates extracted after each cycle for the market. Care of course, should be exercised to see that the proper amount of potassium carbonates is also returned to the process before beginning a new cycle.

Any suitable sodium compound other than the carbonate may be employed if desired.

What I claim is:—

1. The process of obtaining from the rock operated upon sufficient combined potassium to start a process of extracting said potassium from potassium bearing silicates, which consists in finely dividing said silicates; adding a sufficient quantity of a suitable sodium compound to the mass thus produced to form substantially one equivalent of sodium oxid for each two equivalents of silicon dioxid present; fusing the mixture thus produced; finely dividing the fused mixture; boiling the fused mixture in water while subjecting the same to the action of carbon dioxid; continuing the treatment with carbon dioxid until a substantial portion of the combined potassium present has been dissolved from the rock material; recovering said potassium mixed with the combined sodium originally added; taking from the last named mixture a substantial portion of its combined sodium and potassium; returning the remaining portion of said combined sodium and potassium to a new cycle; and repeating said procedure until an amount of combined sodium equal to that originally added to the rock has been removed from the process, substantially as described.

2. The process of obtaining sufficient combined potassium to decompose potassium bearing silicates which consists in finely dividing said silicates; adding thereto a sufficient quantity of sodium carbonate to form substantially one equivalent of sodium oxid for each two equivalents of silicon dioxid present; fusing the mixture; treating the fused mixture in a finely divided condition with carbon dioxid in the presence of water to dissolve out the sodium and potassium carbonates present; recovering said carbonates; removing a substantial portion of the sodium carbonates recovered; returning the remaining carbonates to the process; and repeating the cycle until substantially all the sodium carbonate originally added has been removed, substantially as described.

3. The process of extracting potassium carbonate from potassium bearing silicates which consists in finely dividing said silicates; adding to the mass thus produced sodium carbonate; fusing the mixture to a glass like mass; treating the fused product in a finely divided condition and in the presence of water with a gas containing carbon dioxid until substantially no undecomposed silicates remain to dissolve out the sodium and potassium carbonates; recovering said carbonates and removing therefrom a quantity substantially equal to that extracted from the rock; and repeating the cycle until the desired quantity of potassium carbonate has been obtained, substantially as described.

4. The process of extracting combined potassium from potassium bearing silicates which consists in mixing with said silicates in a fine state of subdivision combined sodium; bringing the mixture to a glass like mass in a state of fusion; boiling the fused product in the presence of water with a gas containing carbonic acid until substantially all the silicates present have been decomposed to dissolve out the combined alkali metals present; segregating said combined alkali metals; removing a portion of the latter equal to the portion of the same extracted from the rock; and repeating the cycle until the desired quantity of combined potassium is obtained, substantially as described.

5. The process of extracting potassium salts from minerals containing potassium in an insoluble form, comprising mixing the powdered mineral with sodium carbonate in proportions to form a glass like mass, heating the mass until fusion takes place and the carbon dioxid is driven off, mixing the mass with water, treating it with carbon dioxid, and separating the potassium carbonate thus formed from the mass.

In testimony whereof I affix my signature in presence of two witnesses.

SAMUEL R. SCHOLES.

Witnesses:
W. E. JOHNES,
R. F. BRENNER.